T. E. SMYTHE.
TIRE REPAIR TOOL.
APPLICATION FILED NOV. 7, 1917.

1,284,485.

Patented Nov. 12, 1918.

WITNESSES
Jas. K. McCathran
H. O. Parker

INVENTOR
Thomas E. Smythe
BY
C. G. Giggers
ATTORNEY

UNITED STATES PATENT OFFICE.

THOMAS E. SMYTHE, OF GRAND RAPIDS, MICHIGAN.

TIRE-REPAIR TOOL.

1,284,485.     Specification of Letters Patent.     Patented Nov. 12, 1918.

Application filed November 7, 1917. Serial No. 200,727.

*To all whom it may concern:*

Be it known that I, THOMAS E. SMYTHE, a citizen of the United States, residing at Grand Rapids, in the county of Kent and State of Michigan, have invented a new and useful Tire-Repair Tool, of which the following is a specification.

The invention relates to a tool, and more particularly to the class of tire repair tools.

The primary object of the invention is the provision of a tool of this character wherein cuts or punctures in a tire can be properly opened for the removal of dirt, gravel or other foreign material therein, and the injecting of a healing medium for closing or sealing the cut or puncture.

Another object of the invention is the provision of a tool of this character wherein the jaws for opening the cut or puncture in the tire will be held separated or sustained spread apart so that manual force is not required to maintain said jaws separated or spread apart, thereby giving free use of the hands of the user for the repairing of the cut.

A further object of the invention is the provision of a tool of this character wherein the construction of the jaws is such that different sizes of openings in tires can be forcibly expanded and held in such position to permit the convenient and easy insertion of repair material with despatch without requiring excessive labor on the part of the operator of the tool.

A still further object of the invention is the provision of a tool of this character which is extremely simple in construction, easily and readily manipulated, strong, durable and inexpensive to manufacture.

With these and other objects in view, the invention consists of the features of construction, combination and arrangement of parts as will be hereinafter fully described, illustrated in the accompanying drawing and pointed out in the claims hereunto appended.

In the accompanying drawing.

Similar reference characters indicate corresponding parts throughout the several views in the drawing.

Figure 1:
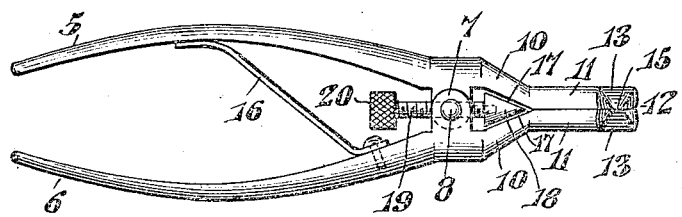
Figure 1 is a side elevation of the tool constructed in accordance with the invention.
Figure 2:
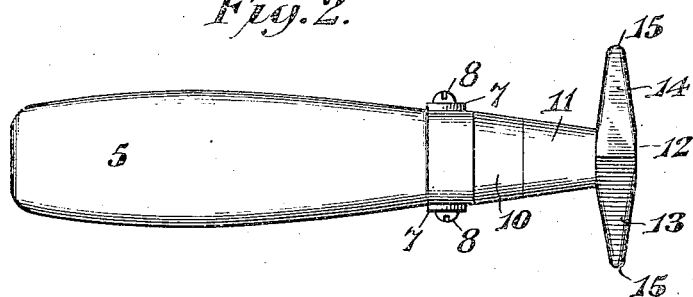
Fig. 2 is a top plan view thereof.

Referring to the drawing in detail, the tool comprises complementary levers 5 and 6, respectively, which are preferably outwardly arched or bowed for the convenient gripping thereof by the user in the manipulation of the tool. The levers 5 and 6, are formed with parallel pivot ears 7, which overlap each other at opposite sides of said levers, and receive therein bolt members 8 constituting the pivots connecting the levers together for swinging movement. The bolt members are freely passed through suitable holes in the ears 7, and are threaded in opposite ends of a bearing 9, which is located between the ears 7 and the opposed levers 5 and 6, for a purpose presently described.

Formed on the pivot portions of the levers 5 and 6, and extending therefrom are forwardly converging bight extensions 10, from which project normally parallel shanks 11 which terminate in heads 12. The heads are tapered toward each end, thus forming two pairs of spreading jaws 13 and 14. The jaws 13 have their ends of less size than the ends of jaws 14, so that said jaws 13 may be inserted in a small cut or opening, while the jaws 14 will engage in a larger cut or opening, as the occasion may require.

Figures 3, 4:
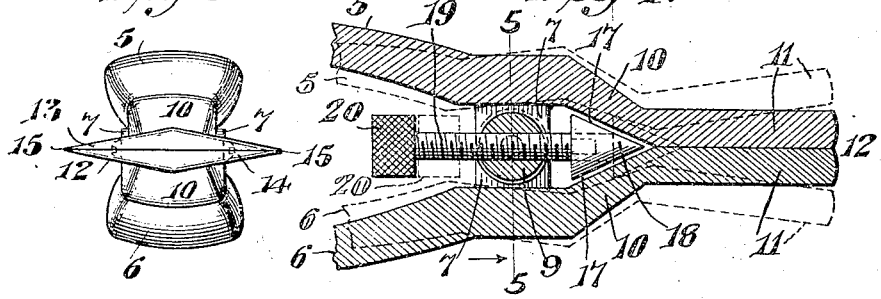
Fig. 3 is an end elevation looking toward the jaw extremities.
Fig. 4 is an enlarged fragmentary vertical longitudinal sectional view; showing by full lines the normal, closed position of the tool, and by dotted lines the open position.
Figure 5:
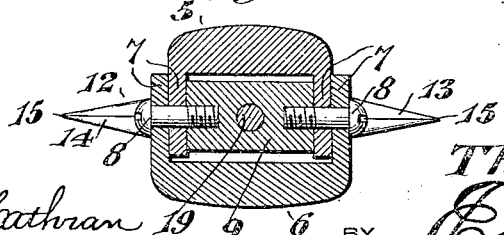
Fig. 5 is a sectional view on the line 5—5 of Fig. 4, looking in the direction of the arrow.

The jaws 13 and 14 at their inner faces are flat for contact with each other, and, when together, present a substantially diamond shaped configuration, the ends 15 of the jaws being pointed as is clearly shown in Figs. 1 and 3 of the drawing, thereby enabling the easy insertion of either the jaws 13 or the jaws 14 into a cut or opening in a tire, for the spreading of the cut or opening on the separation of said jaws by forcibly pressing the levers 5 and 6 toward each other in the manipulation of the tool.

Mounted on the lever 6, on the inner side thereof remote from the free end, is a leaf spring 16 which plays against the other lever 5, and this spring normally holds the jaws together in contact with each other.

The bight extensions 10 therebetween form a wedge shaped gap 17 against the walls of which is adapted to work a substantially conical shaped spreading head 18 constituting a wedge, the same being swiveled or otherwise loosely mounted on one end of an adjusting screw 19, which is threaded centrally in the bearing 9. The angle at the apex of the conical head is preferably made equal to the angle between the converging bight extensions of the levers. The screw is provided at its opposite end with a knurled knob 20, which is accessible from either side of the tool between the levers 5 and 6 to permit manual turning of the adjusting screw 19. It is seen that to move the wedge 18 in a forward direction will act upon the bight extensions 10 to spread the jaws 13 and 14 apart. This is done after either of said jaws have been inserted in a cut or opening in a tire, in order to expand such cut or opening to the desired degree for the convenient and easy insertion of repair material for the healing of said cut or opening. Thus, by reason of the wedging action of the head 18 between the bight extensions 10, the jaws will be held spread apart against the resistance of the spring 16 playing between the levers 5 and 6, and said jaws will be sustained in their spread apart condition without forcible exertion on the part of the user of the tool, so that the user will be able to properly handle the repair material.

The cut or opening in the tire may be expanded to the extent desired by manually pressing the levers 5 and 6, and the wedging head 18 then set for sustaining the jaws spread apart, or the user of the tool may compress the levers for the separation of the jaws and, by the hand, hold the jaws separated without adjusting the wedging head 18. It is preferable, however, to force the head 18 into the gap 17 for action upon the extensions 10 to hold the jaws 13 and 14 separated, and thereby relieve the operator from the task of holding the levers forcibly pressed when in the act of repairing a tire.

It will be apparent that the jaws 13 and 14 project at right angles to opposite sides of the levers 5 and 6 and extend laterally in this direction, thereby making the tool readily reversible and insertible in a cut or opening in a tire for the expanding of the same for the repairing of said tire.

From the foregoing it is thought that the construction and manner of the operation of the tool will be clearly understood, and, therefore, a more extended explanation has been omitted. However, it is to be understood that changes, variations and modifications may be made in the invention, such as come properly within the scope of the appended claims, without departing from the spirit of the invention or sacrificing any of its advantages.

The tool is capable of easy adjustment for repairing a tire; it is comparatively light in weight; possesses the desired strength and durability; can be conveniently carried, and its compactness enables it to be stored in a small space.

What is claimed is:—

1. In combination with a pair of pivotally connected levers having jaws at one end adapted to be spread apart, adjustable means located between the levers and extending longitudinally therewith for spreading and holding the jaws a fixed distance apart, said means bearing against the inner side of both levers in advance of the pivot when actuating the same.

2. A tool of the character described comprising a pair of pivotally connected levers having jaws, a wedge member located between the levers for action thereon to spread the jaws apart, and a manually operated means supported between the levers at the pivotal point thereof and connected with the wedge member for moving the same.

3. A tool of the character described comprising a pair of pivotally connected levers, forwardly converging bight extensions on said levers, shanks on said extensions, opposed jaws carried by said shanks, a wedge member located between the bight extensions for action thereon to spread the jaws apart, and a manually operated adjusting screw supported between the levers at the pivotal point thereof and connected with the wedge member for moving the same.

4. A tool of the character described comprising a pair of levers formed with forwardly converging bight extensions and having pivot ears, a bearing between the ears and levers, pivots passed through the ears and engaged in the bearing, an adjusting screw threaded in the bearing, a wedge member swiveled on the adjusting screw and working against the extensions, opposed jaws connected to said extensions and adapted to be spread apart by the wedge member when moved in one direction by the adjusting screw.

5. In combination with a pair of pivoted levers formed with forwardly converging bight extensions, a bearing between the levers, an adjusting screw threaded in the bearing, a wedge-member swiveled on the forward end of the adjusting screw and working against the extensions, shanks formed on the extensions, and jaws on said shanks adapted to be spread apart by forward movement of the adjusting screw, the path of movement of the adjusting screw being at right angles to the path of movement of the spreading jaws.

6. A tool of the character described comprising a pair of pivotally connected levers, said levers having at one end duplex jaws formed by substantially T-shaped heads, said jaws being arranged in the same horizontal plane as the levers, said jaws being flat on their opposed faces for contact with each other and being reversely tapered with respect to each other, and manually operable means for spreading the jaws apart.

7. A tool of the character described comprising a pair of levers pivotally connected, and having jaws at their outer ends, said jaws extending laterally from opposite sides of said levers and flat on their inner opposed faces, each jaw being tapered toward its outer end, one pair of jaws being of less size at their ends than the other pair.

8. A tool of the character described comprising a pair of pivotally connected levers, parallel shanks on the ends of said levers, and T-shaped heads on the outer ends of the shanks and in the same horizontal plane therewith, said heads forming duplex jaws which are reversely tapered with respect to each other and extend laterally outward in opposite directions from said shanks, said jaws and shanks being flat on their inner opposed faces.

9. A tire repair tool comprising a pair of pivoted levers formed with forwardly converging bight extensions, jaws at the ends of the levers, and an adjusting screw working in a bearing between the levers, said adjusting screw carrying a swiveled conical head which bears against the bight extensions at the inner side thereof.

In testimony that I claim the foregoing as my own, I have hereto affixed my signature in the presence of two witnesses.

THOMAS E. SMYTHE.

Witnesses:
CHARLES A. WATT,
LAURA E. HANNAFORD.

Copies of this patent may be obtained for five cents each, by addressing the "Commissioner of Patents. Washington, D. C."